United States Patent
Nagel et al.

(10) Patent No.: US 9,030,851 B2
(45) Date of Patent: May 12, 2015

(54) DC BUS VOLTAGE CONTROL METHOD AND SYSTEM

(75) Inventors: Gerry M. Nagel, Sussex, WI (US); Todd M. Oestreich, Cedarburg, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 225 days.

(21) Appl. No.: 12/771,890

(22) Filed: Apr. 30, 2010

(65) Prior Publication Data

US 2011/0267851 A1    Nov. 3, 2011

(51) Int. Cl.
*H02M 5/45* (2006.01)
*H02M 3/156* (2006.01)
*H02M 3/155* (2006.01)
*H02M 1/00* (2006.01)

(52) U.S. Cl.
CPC .............. *H02M 3/156* (2013.01); *H02M 3/155* (2013.01); *H02M 2001/007* (2013.01)

(58) Field of Classification Search
USPC ............. 363/34, 35, 37, 95, 97, 98, 131, 132, 363/68; 323/223, 220; 318/33; 307/66
See application file for complete search history.

(56) References Cited

U.S. PATENT DOCUMENTS

| | | | |
|---|---|---|---|
| 4,985,819 A * | 1/1991 | Mori et al. | 363/37 |
| 4,994,950 A * | 2/1991 | Gritter | 363/41 |
| 6,714,429 B2 * | 3/2004 | Phadke | 363/89 |
| 7,158,393 B2 * | 1/2007 | Schneider | 363/34 |
| 7,402,965 B2 * | 7/2008 | Oestreich et al. | 361/33 |
| 2005/0219868 A1 * | 10/2005 | Inukai | 363/20 |
| 2008/0031021 A1 * | 2/2008 | Ros et al. | 363/46 |
| 2009/0052215 A1 * | 2/2009 | Watanabe | 363/131 |
| 2010/0078998 A1 * | 4/2010 | Wei et al. | 307/31 |
| 2010/0080022 A1 * | 4/2010 | Schmidt | 363/53 |
| 2011/0026280 A1 * | 2/2011 | Saruwatari et al. | 363/37 |
| 2011/0241580 A1 * | 10/2011 | Winterhalter et al. | 318/400.3 |

* cited by examiner

*Primary Examiner* — Adolf Berhane
*Assistant Examiner* — Nusrat Quddus
(74) *Attorney, Agent, or Firm* — Fletcher Yoder, P.C.

(57) ABSTRACT

A method for controlling voltage of a DC bus in a converter circuit is provided. The method includes monitoring a duty cycle of a switch that connects a resistive circuit across the DC bus, the switch being closed when the DC bus voltage reaches an upper voltage value and opened when the DC bus voltage reaches a lower voltage value and altering the lower voltage value based upon the duty cycle of the switch.

23 Claims, 4 Drawing Sheets

DC BUS VOLTAGE CONTROL METHOD AND SYSTEM

BACKGROUND

The invention relates generally to converter circuits, and particularly to a converter circuit with adjustable DC bus voltage.

Wide ranges of equipment utilizing various converter circuits are known, such as electric motor drive systems used in factory automation systems, power generation systems and so forth. Typically an electric motor drive is connected to a power source, most often the power grid, and operates to provide electrical power to a load in a controlled manner.

In alternating current (AC) motor drive systems, electrical power is converted from an AC power source into direct current (DC) power via a rectifier. The DC power is then converted via a power converter coupled to the converter through a DC bus into AC power with controlled frequency, phase and amplitude, which may be applied to drive the electric motor.

Typically, the electric motor drive systems have a fixed upper DC bus voltage limit. When driving certain types of loads, such as inertial loads, power may be regenerated by motion of the load that flows into the DC bus, potentially raising the DC bus voltage to within a range near or just below this limit. In systems that cannot channel this regenerated power to the power grid, this excess power regenerated by the electric motor may be absorbed and subsequently dissipated through shunt resistors that can be electrically coupled across the DC bus. Because these resistors simply convert the power to heat, their use may substantially reduce the efficiency of such systems. Furthermore, components of such systems may be subjected to substantially high temperatures and may require additional cabinet cooling.

Accordingly, it would be desirable to develop a motor drive system having some mechanism for reducing the amount of power dissipated by shunt resistors in this manner to enhance efficiency and reliability of such systems.

BRIEF DESCRIPTION

Briefly, according to one embodiment of the present invention, a method is provided for controlling voltage of a DC bus in a converter circuit. The method includes monitoring a duty cycle of a switch that connects a resistive circuit across the DC bus, the switch being closed when the DC bus voltage reaches an upper voltage value and opened when the DC bus voltage reaches a lower voltage value and altering the lower voltage value based upon the duty cycle of the switch.

In accordance with another aspect, a system for controlling voltage of a DC bus in a converter circuit is provided. The system includes a rectifier configured to convert AC power to DC power applied to the DC bus, a shunt resistor and a switch coupled to the shunt resistor and to the DC bus, and configured to place the shunt resistor electrically across the DC bus. The system further includes a power converter coupled to the DC bus and configured to convert DC power from the bus to AC output power and control circuitry coupled to the switch and configured to change either an upper switching limit or a lower switching limit, or both, of the switch based upon a duty cycle of the switch.

In accordance with another aspect, a method is provided for controlling voltage of a DC bus in a converter circuit. The method includes monitoring a duty cycle of a switch that connects a shunt resistor across the DC bus, the switch being closed when the DC bus voltage reaches an upper voltage value and opened when the DC bus voltage reaches a lower voltage value and dynamically altering the lower voltage value based upon the duty cycle of the switch. The method further includes operating the converter circuit with the altered lower voltage value, dissipating a portion of power generated by the converter circuit through the shunt resistor and storing the power not dissipated by the resistive circuit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present technique function to provide a system for controlling voltage of a DC bus in a converter circuit. In particular, the present technique utilizes parameters such as the duty cycle of a switch connecting a resistive circuit across the DC bus to dynamically adjust the voltage of the DC bus, thereby increasing efficiency of such systems. Advantageously, the dynamic adjustment of the DC bus voltage allows for the natural fluctuation of the DC bus voltage to occur, while dynamically adjusting a lower threshold used to switch in and out the resistive circuit, thereby adapting the operation to dissipate a lower amount of power, when possible, than would be dissipated using a conventional fixed lower threshold.

References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
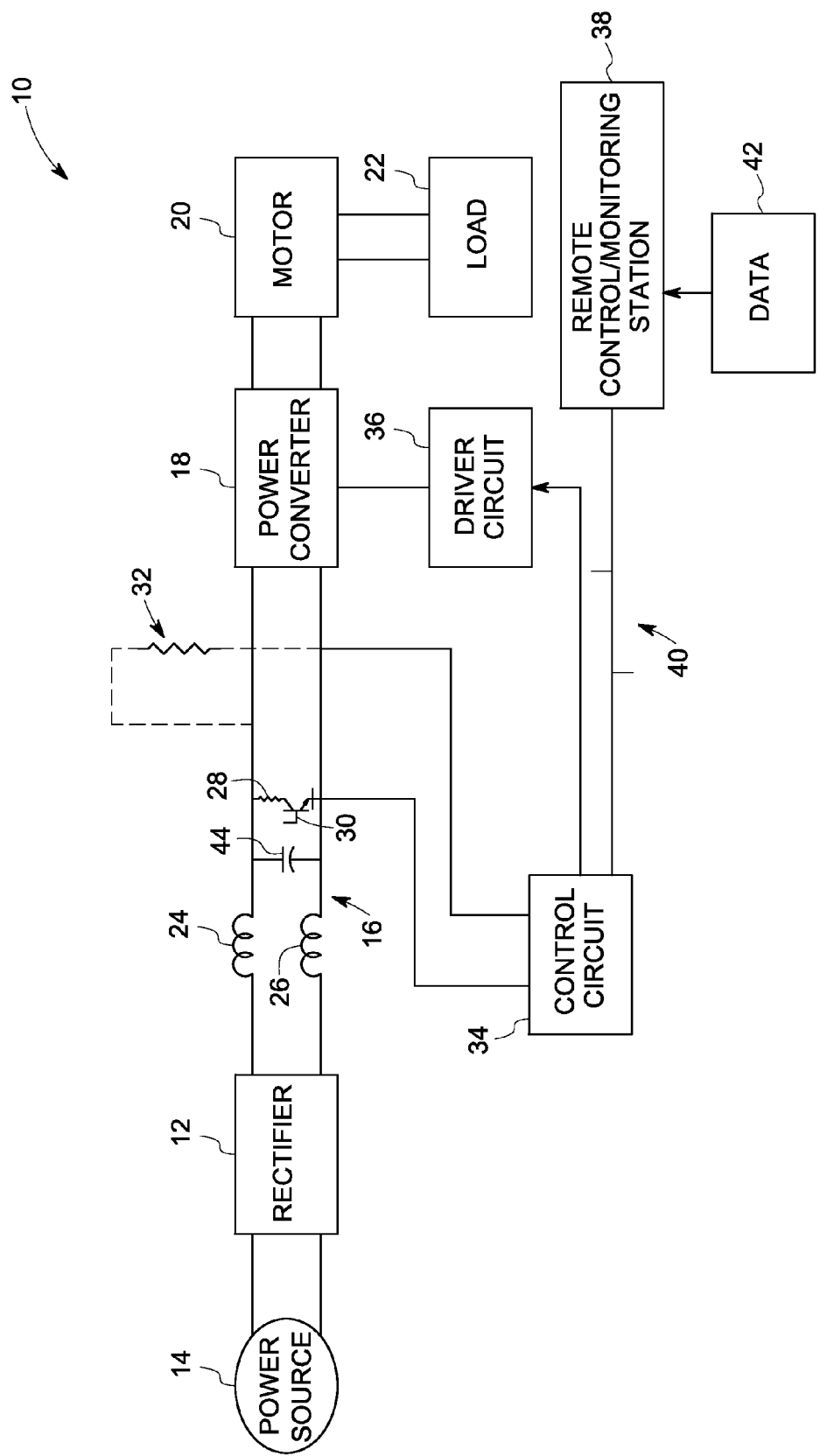
FIG. 1 illustrates a converter circuit with adjustable DC bus voltage in accordance with aspects of the present invention.

Turning now to drawings and referring first to FIG. 1, a converter circuit such as a motor drive system 10 is illustrated. The motor drive system 10 includes a rectifier 12 configured to receive incoming AC power from a power source 14 and to convert the AC power to DC power applied to a DC bus 16. The motor drive system 10 also includes a power converter 18 coupled to the DC bus 16 and configured to convert DC power from the bus 16 to AC output power. Further, a motor 20 is coupled to and driven by the power converter 18. In the illustrated embodiment, the motor drive system 10 further includes a load 22 coupled to and driven by the motor 20.

In the illustrated embodiment, the motor drive system 10 further includes inductors such as represented by reference numerals 24 and 26, coupled to the DC bus 16 and a shunt resistor 28 coupled across the DC bus 16. Further, a switch 30 is coupled to the shunt resistor 28 and to the DC bus 16. The switch 30 is configured to place the shunt resistor 28 electrically across the DC bus 16. As will be appreciated by those skilled in the art, suitable power electronic devices such as insulated gate bipolar transistors may be used as the switch 30. However, other suitable switching devices such as power field-effect transistors (FET), MOS-controlled transistors MCT, conventional thyristors, or the like may be used as the switch 30.

The shunt resistor 28 (which in practice may include one or more actual resistors) is configured to dissipate excess power generated during operation of the motor drive system 10, essentially converting the power to heat, thereby maintaining the DC bus voltage within desired levels. In this exemplary embodiment, the switch 30 is closed when the DC bus voltage reaches an upper voltage value. Alternately, the switch 30 is opened when the DC bus voltage value reaches a lower voltage value. In certain embodiments, the motor drive system 10 may include additional shunt resistors such as represented by reference numeral 32 coupled across the DC bus 16 to dissipate the heat, also controlled by the switch 30.

The motor drive system 10 further includes control circuitry 34 coupled to the switch 30. The control circuitry 34 is configured to change either an upper switching limit or threshold, or a lower switching limit or threshold, or both, used to trigger opening and closing of the switch 30 based upon a duty cycle of the switch 30. In one exemplary embodiment, the control circuitry 34 is configured to change the lower switching limit based upon an inactive time of the switch 30.

In particular, the control circuitry 34 is configured to increase a lower voltage value of the DC bus 16 upon detection that an open time of the switch has increased. Moreover, the control circuitry 34 is configured to decrease a lower voltage value of the DC bus 16 upon detection that an open time of the switch has decreased. As described below, this has the result of utilizing the shunt resistor less in applications in which the load does not tend to require much (or any) dissipation of regenerated power, while allowing for adaptive use of the resistor should conditions demand.

In the illustrated embodiment, the motor drive system 10 further includes a driver circuit 36 for controlling operation of the power converter 18. In one exemplary embodiment, the control circuitry 34 is configured to compute a value of power not dissipated by the shunt resistor 28 in comparison to a base condition. In this exemplary embodiment, the base condition is indicative of a duty cycle that the switch 30 would have had if a substantially constant switching threshold had been implemented.

In this embodiment, the control circuitry 34 is configured to communicate the value of power not dissipated to a remote control and/or monitoring station 38 via a network 40. As will be appreciated by those skilled in the art, the network 40 may include components such as network cables, network interface cards, routers and bridges to communicate with the control circuitry 34.

The remote control and/or monitoring station 38 may be further configured to receive data 42 such as utility costs for shunting the power not dissipated by the system 10. Furthermore, the motor drive system 10 includes a plurality of capacitors such as represented by reference numeral 44 electrically coupled across the DC bus 16. In normal operation these devices 44 aid in reducing ripple or fluctuation in the bus voltage, and may also store some amount of power not dissipated by the shunt resistor 28, such as to allow for dynamic adaptation of the switch threshold(s).

Figure 2:
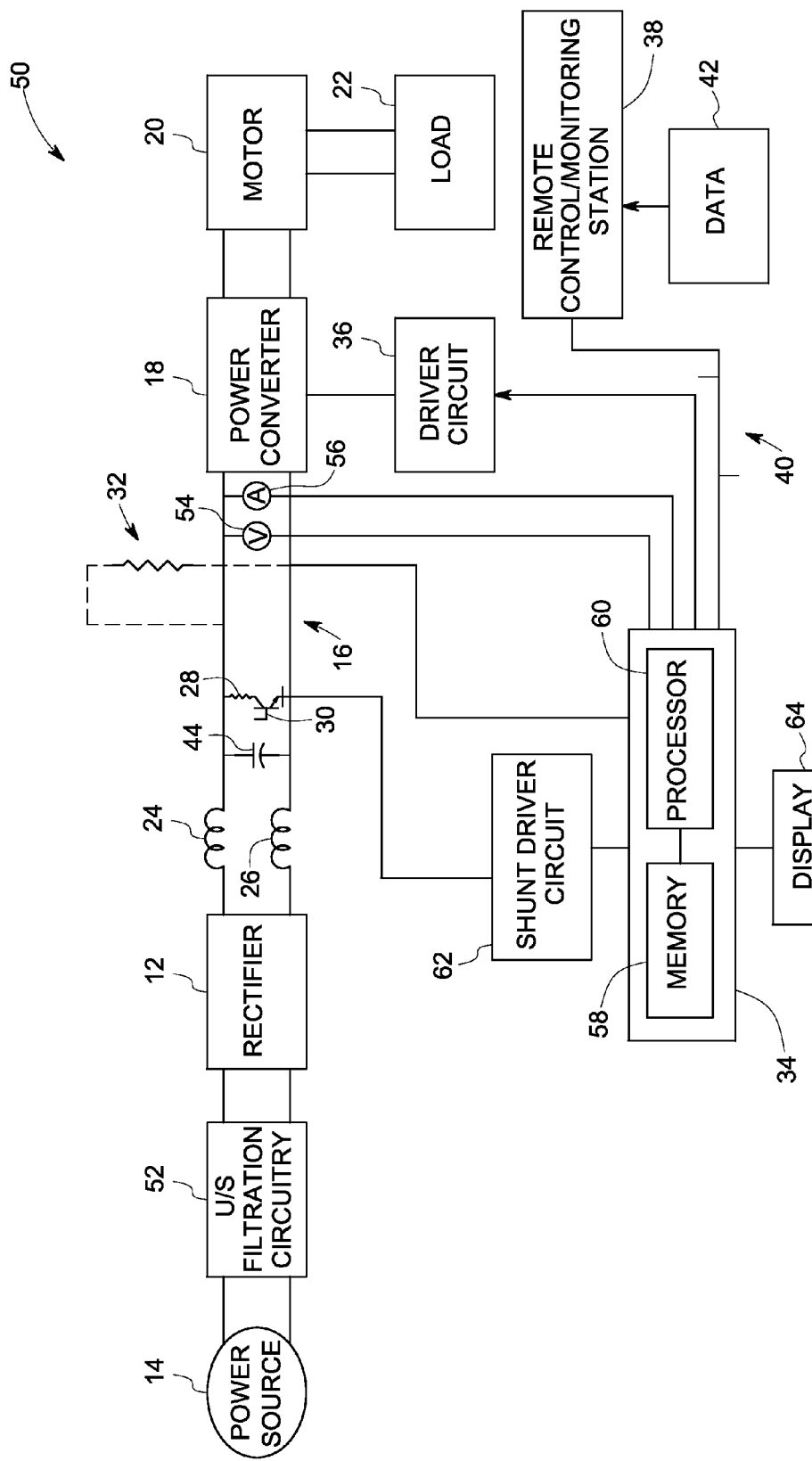
FIG. 2 illustrates an exemplary configuration of the motor drive system of FIG. 1 in accordance with aspects of the present invention.

FIG. 2 illustrates an exemplary configuration 50 of the motor drive system 10 of FIG. 1. In the illustrated embodiment, the power source 14 includes a three phase power supply that outputs three phase voltages and current waveforms out of phase with one another by $2\pi/3$ radians (e.g., from the power grid). However, other configurations of the input power source 14 with different numbers of phases (e.g., 1 or 2) and waveforms may be envisaged.

The motor drive system 50 further includes the AC-DC rectifier 12 that converts incoming AC voltage from the power source 14 to DC voltage on the DC bus 16. In this exemplary embodiment, the rectifier 12 includes a passive rectifier. In this exemplary embodiment, the motor drive system 10 further includes filtration circuitry 52 for filtering higher order harmonics from AC voltage received from the power source 14. For example, the filtration circuitry 52 may include an electromagnetic interference and harmonic filter.

Moreover, the motor drive system 50 includes the DC-AC converter 18 (e.g., an inverter) that may be formed by an array of solid-state switches and associated diodes to convert DC voltage from the DC bus 16 to three-phase output AC voltage that is applied to an electrical device such as the motor 20. As will be appreciated by those skilled in the art, the switches may include any suitable power electronic devices such as insulated gate bipolar transistors.

The motor 20 may be of any desired physical and electrical configuration, such as a permanent magnet motor, an induction motor, a synchronous motor, and so forth, configured to receive power from the power bus 16 and to drive the load 22 such as an electrical machine or a process. It should be noted that a range of other components may be included in the motor drive system 50 illustrated in FIG. 2.

Moreover, the motor drive system 50 includes voltage and current sensors such as represented by reference numerals 54 and 56 configured to monitor the voltage and current of the DC bus 16. In this particular embodiment, the control circuitry 34 is configured to alter a lower voltage value of the DC bus 16 based upon the duty cycle of the switch 30.

In the illustrated embodiment, the control circuitry 34 includes a memory 58 configured to store the inactive time data of the switch 30. Further, the control circuitry 34 also includes a processor 60 configured to generate control signals to alter the lower switching limit of the switch 30 based upon the time that it is not in a conducting state (i.e., during which it places the shunt resistor across the DC bus), referred to herein as the inactive time. The memory 58 may include hard disk drives, optical drives, tape drives, random access memory (RAM), read-only memory (ROM), programmable read-only memory (PROM), redundant arrays of independent disks (RAID), flash memory, magneto-optical memory, holographic memory, bubble memory, magnetic drum, memory stick, Mylar® tape, smartdisk, thin film memory, zip drive, and so forth.

It should be noted that the present invention is not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art.

In operation, the control circuitry 34 monitors the duty cycle of the switch 30 and alters the lower voltage value of the DC bus voltage. In the illustrated embodiment, the operation of the shunt resistor 28 is controlled via a shunt driver circuit 62 based upon the sensed DC bus voltage. Further, the power not dissipated by the shunt resistor 28 may cause natural variations in the DC bus voltage within desired limits, and when not dissipated, may be stored in the capacitor 44. In certain embodiments, a value representative of the power stored through the capacitor 44 may be displayed to a user through a display 64. In certain embodiments, the control circuitry 34 is configured to limit lowering of the lower voltage value of the DC bus voltage as will be described in detail below with reference to FIG. 3.

Figure 3:
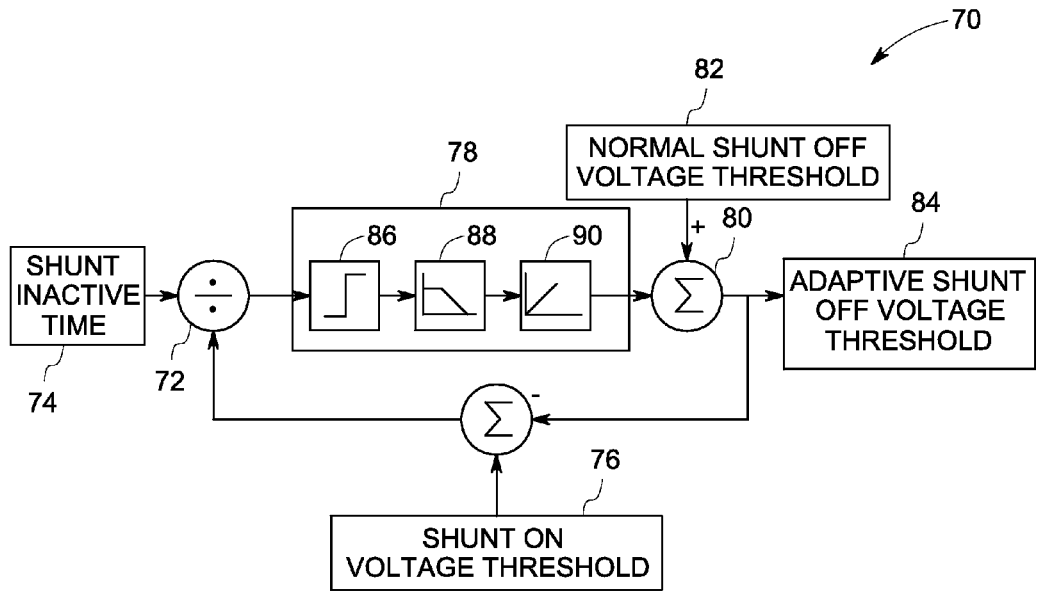
FIG. 3 illustrates process steps for dynamically adjusting the DC bus voltage based upon an inactive time of the shunt resistor using the control circuitry of FIG. 2.

FIG. 3 illustrates exemplary process steps 70 for dynamically adjusting the DC bus voltage based upon an inactive time of the shunt resistor 28 using the control circuitry 34 of FIG. 2. At block 72, an inactive time or open time 74 of the switch 30 is divided by the difference of an upper voltage value 76 of the DC bus 16 (practically, an upper limit or threshold typically set based on voltage limits of system components) and the adaptive shunt off voltage threshold. In certain embodiments, the upper voltage value 76 of the DC bus 16 may be a user-defined value. Further, at block 78, the resulting quotient value is filtered to obtain a change value 80 for a lower voltage value of the DC bus 16.

The change value 80 is then added to a lower voltage value 82 to obtain the new lower voltage value 84, which is the adaptive shunt off voltage threshold for the shunt resistor 28. Again, the lower voltage value 82 for the DC bus may be a user-defined value. In this exemplary embodiment, the switch 30 is opened when the DC bus voltage value reaches the adaptive shunt off voltage threshold. It should be noted that such process may be repeated and carried out cyclically or periodically to dynamically adjust the lower voltage value of the DC bus 16 in response to the shunt inactive time 74.

In the illustrated embodiment, the quotient value obtained at block 72 is filtered to limit lowering of the lower voltage value when the switch 30 is open for extended periods of time. As illustrated, an inverse of the slope of DC bus charging voltage is computed to limit the lower voltage value in such condition (block 86). Moreover, a linear low pass filter is applied to limit a step change and a time rate change of the lower voltage value (block 88).

After filtering the quotient value to limit an absolute value of the change and the change over a period of time, the quotient value is converted from time to voltage to compute the absolute change value 80 of the voltage (block 90). This change value 80 is subsequently added to the lower voltage value 82.

Figure 4:
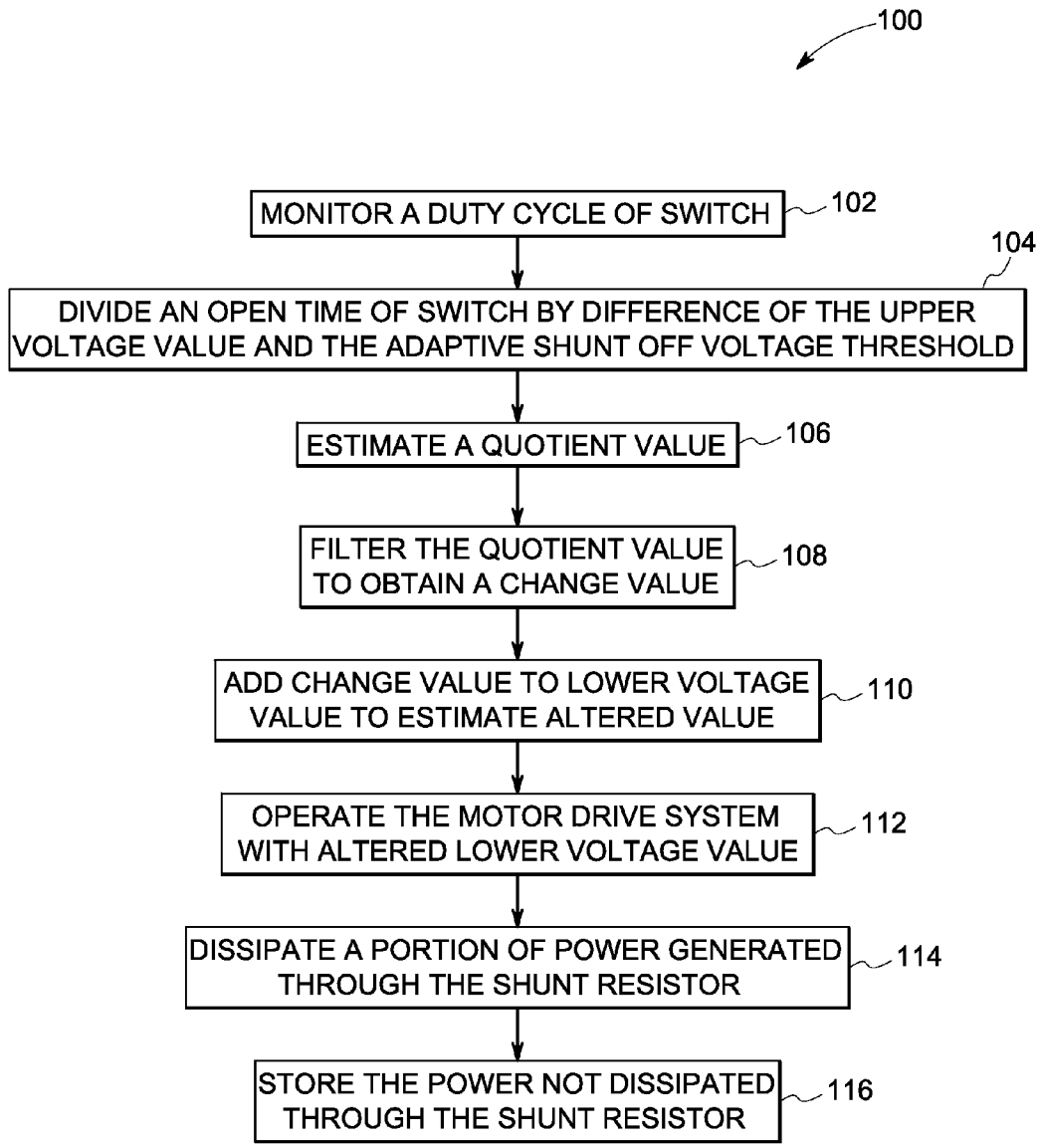
FIG. 4 illustrates an exemplary method for controlling voltage of a DC bus in the motor drive system of FIG. 1 in accordance with aspects of the present invention.

FIG. 4 illustrates an exemplary method 100 for controlling voltage of a DC bus in the motor drive system 10 of FIG. 1. At block 102, a duty cycle of the switch that connects a shunt resistor across the DC bus is monitored. In this exemplary embodiment, the switch is closed when the DC bus voltage reaches an upper voltage value and is opened when the DC bus voltage reaches a lower voltage value. Further, an open time of the switch is divided by the difference of the upper voltage value and the adaptive shunt off voltage threshold to estimate a quotient value (block 104).

At block 106, the estimated quotient value is filtered to obtain a change value for the lower voltage value. In one exemplary embodiment, the quotient value is filtered to limit lowering of the lower voltage value when the switch is open for extended periods of time. In another exemplary embodiment, a step change or a time rate change of the lower voltage value is limited by the filtering of the quotient. Moreover, the change value is added to the lower voltage value to estimate altered lower voltage value (block 108). At block 110, the motor drive system is operated with the altered lower voltage value of the DC bus.

Furthermore, a portion of power generated is dissipated using the shunt resistor (block 112). In addition, the power not dissipated by the shunt resistor is stored using capacitors coupled across the DC bus. Advantageously, the dynamic adjustment of the lower voltage value facilitates storing of additional energy that would otherwise be dissipated as heat. As a result, the components of the motor drive system are subjected to lower temperatures and less power is actually wasted, thereby enhancing efficiency and reliability of such systems.

Figure 5:
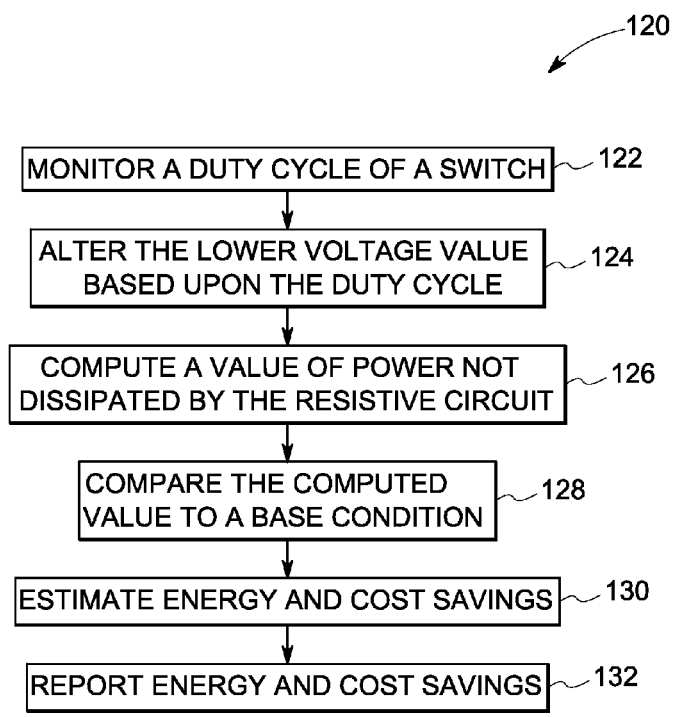
FIG. 5 illustrates an exemplary method for controlling voltage of the DC bus and estimating energy and cost savings for the motor drive system of FIG. 1 in accordance with aspects of the present invention.

FIG. 5 illustrates an exemplary method 120 for controlling voltage of the DC bus and estimating energy and cost savings for the motor drive system 10 of FIG. 1. At block 122, a duty cycle of the switch connecting a resistive circuit across the DC bus is monitored. Further, a lower voltage value of the DC bus is altered based upon the duty cycle (block 124). In one embodiment, the lower voltage value is decreased upon detection that an open time of the switch has decreased. In an alternate embodiment, the lower voltage value is increased upon detection that an open time of the switch has increased. The motor drive system is operated using the altered lower voltage value.

Furthermore, a value of power not dissipated by the resistive circuit is computed (block 126). At block 128, the computed power or a value representative of or related to the power is compared to a base condition. In this exemplary embodiment, the base condition includes a duty cycle that the switch would have had if the lower voltage value had not been changed. Further, energy and costs savings are estimated using the altered lower voltage value with respect to the base condition (block 130). At block 132, the energy and costs savings are reported to a user via a display or through a communication network.

For example, a base condition corresponds to a DC bus lower voltage value of about 765 V. In this example embodiment, the DC bus lower voltage value is increased to about 785 V in response to change in the duty cycle of the switch. Thus the additional amount of energy stored in the DC bus capacitors may be estimated as follows:

$$\text{Energy} = \frac{1}{2}C(V_{new}^2 - V_{old}^2) = \frac{1}{2}C(785^2 - 765^2) = 15500 \frac{\text{Joules}}{\text{Farad}} \quad (1)$$

As can be seen, increasing the lower voltage value by about 20 Volts enables the motor drive system to store an additional energy of about 15500 Joules per Farad in the DC bus capacitors that would otherwise be dissipated as heat.

As will be appreciated by those of ordinary skill in the art, the foregoing example, demonstrations, and process steps may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, such as C++ or JAVA.

Such code, as will be appreciated by those of ordinary skill in the art, may be stored or adapted for storage on one or more tangible, machine readable media, such as on memory chips, local or remote hard disks, optical disks (e.g., CD's or DVD's), or other media, which may be accessed by a processor-based system to execute the stored code. Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

The various aspects of the structures described hereinabove may be used for adjusting upper and/or lower limits for DC bus voltage in motor drive systems. In particular, the technique described above provides dynamic adjustment of the DC bus voltage based upon a duty cycle of a switch connecting the resistive circuits for dissipating the energy generated by such system. Advantageously, this allows storing of additional energy using DC bus capacitors thereby enhancing the drive system efficiency, and substantially reducing operating costs for such systems. The technique also reduces complexity of such systems by eliminating the need for a regenerative front end.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling voltage of a DC bus in a converter circuit, comprising:
    monitoring a duty cycle of a switch that connects a resistive circuit across the DC bus, the switch being closed when the DC bus voltage reaches an upper voltage value and opened when the DC bus voltage reaches a lower voltage value; and
    altering the lower voltage value based upon the duty cycle of the switch by decreasing the lower voltage value upon detection that an open time of the switch has decreased.

2. The method of claim 1, comprising increasing the lower voltage value upon detection that the open time of the switch has increased.

3. The method of claim 1, comprising dividing an open time of the switch by the difference of the upper voltage value and the adaptive shunt off threshold, filtering the resulting quotient value to obtain a change value for the lower voltage value, and adding the change value to the lower voltage value.

4. The method of claim 3, wherein the filtering comprises limiting lowering of the lower voltage value when the switch is open for extended periods of time.

5. The method of claim 3, wherein the filtering comprises limiting a step change of the lower voltage value.

6. The method of claim 3, wherein the filtering comprises limiting a time rate of change of the lower voltage value.

7. The method of claim 1, comprising computing a value of power not dissipated by the resistive circuit in comparison to a base condition.

8. The method of claim 7, wherein the base condition comprises a duty cycle that the switch would have had if the lower switching limit had not been changed.

9. The method of claim 7, comprising determining an economic value of the power not dissipated by the resistive circuit.

10. A system for controlling voltage of a DC bus in a converter circuit, comprising:
    a rectifier configured to convert AC power to DC power applied to the DC bus;
    a shunt resistor;
    a switch coupled to the shunt resistor and to the DC bus, and configured to place the shunt resistor electrically across the DC bus;
    a power converter coupled to the DC bus and configured to convert DC power from the bus to AC output power; and
    control circuitry coupled to the switch and configured to change either an upper switching limit or a lower switching limit, or both, of the switch based upon a duty cycle of the switch, and wherein the control circuitry is configured to change the lower switching limit based upon an inactive time of the switch.

11. The system of claim 10, wherein the control circuitry increases the lower switching limit when the inactive time increases.

12. The system of claim 11, wherein the control circuitry decreases the lower switching limit when the inactive time decreases.

13. The system of claim 10, wherein the control circuitry is configured to compute a value of power not dissipated by the shunt resistor in comparison to a base condition.

14. The system of claim 13, wherein the base condition comprises a duty cycle that the switch would have had if neither the upper switching limit nor the lower switching limit had been changed.

15. The system of claim 13, wherein the control circuitry is configured to communicate the value of power not dissipated to a remote control and/or monitoring station.

16. The system of claim 10, comprising a plurality of capacitors electrically coupled across the DC bus and configured to store the power not dissipated by the shunt resistor.

17. The system of claim 10, comprising at least one sensor to detect the voltage across the DC bus and wherein the control circuitry is configured to alter a lower voltage value of the DC bus based upon the duty cycle of the switch.

18. The system of claim 10, wherein the control circuitry comprises:
    a memory configured to store inactive time data of the switch; and
    a processor configured to generate control signals to alter the lower switching limit of the switch based upon the inactive time.

19. A method for controlling voltage of a DC bus in a converter circuit, comprising:
    monitoring a duty cycle of a switch that connects a shunt resistor across the DC bus, the switch being closed when the DC bus voltage reaches an upper voltage value and opened when the DC bus voltage reaches a lower voltage value;
    dynamically altering the lower voltage value based upon the duty cycle of the switch;
    operating the converter circuit with the altered lower voltage value;
    dissipating a portion of power generated by the converter circuit through the shunt resistor;
    storing the power not dissipated by the shunt resistor; and
    decreasing the lower voltage value upon detection that an open time of the switch has decreased.

20. The method of claim 19, comprising increasing the lower voltage value upon detection that the open time of the switch has increased.

21. The method of claim 19, comprising comparing a value of the stored power with a value of power not dissipated by the shunt resistor for a base condition.

22. The method of claim 20, wherein the base condition comprises a duty cycle that the switch would have had if the lower switching limit had not been changed.

23. A method for controlling voltage of a DC bus in a converter circuit, comprising:
- monitoring a duty cycle of a switch that connects a shunt resistor across the DC bus, the switch being closed when the DC bus voltage reaches an upper voltage value and opened when the DC bus voltage reaches a lower voltage value;
- dynamically altering the lower voltage value based upon the duty cycle of the switch;
- operating the converter circuit with the altered lower voltage value;
- dissipating a portion of power generated by the converter circuit through the shunt resistor;
- storing the power not dissipated by the shunt resistor; and
- increasing the lower voltage value upon detection that the open time of the switch has increased.

* * * * *